US012708805B2

(12) United States Patent
Magnone et al.

(10) Patent No.: US 12,708,805 B2
(45) **Date of Patent: *Aug. 18, 2026**

(54) WET FIRE PROTECTION SYSTEMS AND METHODS FOR STORAGE

(71) Applicant: Tyco Fire Products LP, Cranston, RI (US)

(72) Inventors: Zachary L. Magnone, Warwick, RI (US); Daniel G. Farley, Westminster, MA (US); John Desrosier, East Greenwich, RI (US); Donald D. Brighenti, Westminster, MA (US)

(73) Assignees: Tyco Fire Products LP, Cranston, RI (US); Tyco Fire & Security GmbH, Neuhausen am Rheinfall (CH)

( * ) Notice: Subject to any disclaimer, the term of this patent is extended or adjusted under 35 U.S.C. 154(b) by 174 days.

This patent is subject to a terminal disclaimer.

(21) Appl. No.: 18/782,693

(22) Filed: Jul. 24, 2024

(65) Prior Publication Data

US 2024/0374943 A1 Nov. 14, 2024

Related U.S. Application Data

(63) Continuation of application No. 18/234,138, filed on Aug. 15, 2023, now Pat. No. 12,070,637, which is a (Continued)

(51) Int. Cl.

*A62C 3/00* (2006.01)
*A62C 31/02* (2006.01)

(Continued)

(52) U.S. Cl.

CPC ................ *A62C 3/002* (2013.01); *A62C 3/00* (2013.01); *A62C 31/02* (2013.01); *A62C 35/58* (2013.01);

(Continued)

(58) Field of Classification Search

CPC ........... A62C 35/58; A62C 3/00; A62C 31/02; A62C 3/002; A62C 35/60; A62C 37/36; A62C 37/40; A62C 99/0072

(Continued)

(56) References Cited

U.S. PATENT DOCUMENTS

| | | | |
|---|---|---|---|
| 3,811,511 | A | 5/1974 | McCulloch |
| 3,834,463 | A | 9/1974 | Allard et al. |

(Continued)

FOREIGN PATENT DOCUMENTS

| | | | |
|---|---|---|---|
| DE | 10 2009 018 501 | A1 | 10/2010 |
| JP | 2007-252636 | A | 10/2007 |

OTHER PUBLICATIONS

International Search Report and Written Opinion for International Application No. PCT/US2015/036517, dated Aug. 10, 2015, 11 pages.

(Continued)

*Primary Examiner* — Steven J Ganey
(74) *Attorney, Agent, or Firm* — Foley & Lardner LLP

(57) ABSTRACT

Fire protection systems and methods of fire protection systems for protection of a stored commodity. The systems and methods included a plurality of fluid distribution devices disposed above the stored commodity and configured for selective identification and controlled actuation in response to a fire. The systems have a hydraulic demand defined by at least one of: i) a hydraulic design area having a minimum operational area of less than 768 square feet; or ii) less than twelve hydraulic design devices.

20 Claims, 9 Drawing Sheets

Related U.S. Application Data continuation of application No. 17/713,041, filed on Apr. 4, 2022, now Pat. No. 11,752,373, which is a continuation of application No. 17/062,273, filed on Oct. 2, 2020, now Pat. No. 11,324,977, which is a continuation of application No. 16/560,682, filed on Sep. 4, 2019, now Pat. No. 11,117,003, which is a continuation of application No. 15/319,190, filed as application No. PCT/US2015/036517 on Jun. 18, 2015, now Pat. No. 10,441,830.

(60) Provisional application No. 62/017,370, filed on Jun. 26, 2014, provisional application No. 62/013,591, filed on Jun. 18, 2014.

(51) Int. Cl.

| | |
|---|---|
| ***A62C 35/58*** | (2006.01) |
| ***A62C 35/60*** | (2006.01) |
| ***A62C 37/36*** | (2006.01) |
| ***A62C 37/40*** | (2006.01) |
| ***A62C 99/00*** | (2010.01) |

(52) U.S. Cl.
CPC .............. *A62C 35/60* (2013.01); *A62C 37/36* (2013.01); *A62C 37/40* (2013.01); *A62C 99/0072* (2013.01)

(58) Field of Classification Search
USPC ........................................ 169/16, 17, 37, 54
See application file for complete search history.

(56) References Cited

U.S. PATENT DOCUMENTS

| | | | | |
|---|---|---|---|---|
| 4,217,959 A | | 8/1980 | Poulsen | |
| 5,915,479 A | | 6/1999 | Ponte | |
| 6,296,808 B1 | | 10/2001 | Pearman | |
| 6,585,054 B1 | | 7/2003 | Thomas et al. | |
| 7,165,624 B1 | | 1/2007 | Fischer | |
| 7,735,570 B2 | | 6/2010 | Fischer | |
| 7,793,736 B2 | * | 9/2010 | Golinveaux | A62C 3/002 169/46 |
| 8,176,988 B2 | | 5/2012 | Fischer | |
| RE45,377 E | | 2/2015 | Pounder et al. | |
| 9,381,386 B2 | | 7/2016 | Pigeon | |
| 10,441,830 B2 | | 10/2019 | Magnone et al. | |
| 10,709,914 B1 | * | 7/2020 | Workman | A62C 37/12 |
| 10,960,244 B2 | * | 3/2021 | Magnone | A62C 37/36 |
| 11,007,388 B2 | | 5/2021 | Workman et al. | |
| 11,324,977 B2 | | 5/2022 | Magnone et al. | |
| 11,752,373 B2 | | 9/2023 | Magnone et al. | |
| 12,070,637 B2 | * | 8/2024 | Magnone | A62C 37/36 |
| 2006/0243459 A1 | | 11/2006 | Jackson | |
| 2008/0319716 A1 | | 12/2008 | Golinveaux et al. | |
| 2009/0288846 A1 | | 11/2009 | Leblanc | |
| 2011/0315406 A1 | | 12/2011 | Connery et al. | |
| 2015/0027739 A1 | | 1/2015 | Multer et al. | |
| 2015/0122513 A1 | | 5/2015 | Miller et al. | |
| 2017/0113078 A1 | * | 4/2017 | Magnone | A62C 3/00 |
| 2021/0023402 A1 | * | 1/2021 | Magnone | A62C 37/36 |
| 2021/0023403 A1 | | 1/2021 | Magnone et al. | |

OTHER PUBLICATIONS

National Fire Protection Association, National Fire Codes, Chapter 11, 2013 Edition, printed from the Internet on Feb. 21, 2019, 9 pages.
National Fire Protection Association, National Fire Codes, Chapter 12, 2013 Edition, printed from the Internet on Feb. 21, 2019, 11 pages.
National Fire Protection Association, National Fire Codes, Chapter 21, 2013 Edition, printed from the Internet on Feb. 21, 2019, 6 pages.
National Fire Protection Association, National Fire Codes, Chapter 3, 2013 Edition, printed from the Internet on Feb. 21, 2019, 15 pages.
National Fire Protection Association, National Fire Codes, Chapter 8, 2013 Edition, printed from the Internet on Feb. 21, 2019, 100 pages.
Simplex, 4100 ES Fire Control Panels, Addressable Fire Detection and Control Basic Panel Modules and Accessories, S4100-0031-25, Nov. 2013, 10 pages.
Simplex, TrueAlarm Analog Sensing, TrueAlarm Analog Sensors-Photoelectric, Ionization, and Heat; Standard Bases and Accessories, S4098-0019-12, Aug. 2008, 4 pages.

* cited by examiner

WET FIRE PROTECTION SYSTEMS AND METHODS FOR STORAGE

CROSS-REFERENCE TO RELATED PATENT APPLICATIONS

This application is a continuation of U.S. patent application Ser. No. 18/234,138, filed Aug. 15, 2023, which is a continuation of U.S. patent application Ser. No. 17/713,041, filed Apr. 4, 2022, which is a continuation of U.S. patent application Ser. No. 17/062,273, filed Oct. 2, 2020, which is a continuation of U.S. patent application Ser. No. 16/560,682, filed Sep. 4, 2019, which is a continuation of U.S. patent application Ser. No. 15/319,190, filed Dec. 15, 2016, which is a national stage of International Application No. PCT/US2015/036517, filed Jun. 18, 2015, which claims the benefit of priority to U.S. Provisional Application No. 62/013,591, filed Jun. 18, 2014 and U.S. Provisional Application No. 62/017,370, filed Jun. 26, 2014, each of which is incorporated by reference in its entirety.

TECHNICAL FIELD

The present invention relates generally to fire protection systems for storage. More specifically, the present invention involves fire protection systems for storage arrangements having a reduced hydraulic demand for comparable sized storage arrangements.

BACKGROUND

Industry accepted system installation standards and definitions for storage fire protection are provided in National Fire Protection Association publication, NFPA 13: Standard for the Installation of Sprinkler Systems (2013 ed.) ("NFPA 13"). Chapters 11-12 define standardized hydraulic design approaches for systems designed and installed with "automatic" storage sprinklers, such as for example, standard spray, control mode specific application (CMSA), extended coverage or early suppression fast response (ESFR). NFPA 13 defines "automatic sprinklers" as "a fire suppression or control device that operates automatically when its heat-activated element is heated to its thermal rating or above, allowing water to discharge over a specified area." As used herein, a "hydraulically designed system," is a calculated system in which pipe sizes are selected on a pressure loss basis to provide a prescribed water density, in gallons per minute per square foot, or a prescribed minimum discharge pressure or flow per sprinkler, distributed with a reasonable degree of uniformity over a specified area. The standards specify the hydraulic design area or sprinkler operational area, the density (GPM/SQ. FT) requirements, and/or minimum operating pressures for a given storage commodity and arrangement. A "hydraulic design area" is an area, defined in square units of measure, comprising a defined number of hydraulically remote sprinklers at a defined spacing between each sprinkler. "Hydraulically remote sprinklers" are sprinklers that place the greatest water demand on a system in order to provide a prescribed minimum discharge pressure or flow. It is understood by those skilled in the art that the hydraulically remote sprinklers may or may not be physically located the furthest from the fluid the water supply providing the prescribed minimum pressure or flow.

Chapter 21 of NFPA 13 provides for special approaches that permit hydraulic designs other than those specified under Chapters 11-20. According to Section 21.1.8, the hydraulic design area can be defined by a number of design sprinklers as derived from worst-case results obtained from full-scale fire testing. However, regardless of the fire test results, the special design approaches of NFPA still include minimum design requirements. For example, Section 21.1.8.1 requires that the number of design sprinklers defining the hydraulic demand be no less than: (i) twelve sprinklers for standard coverage sprinklers; (ii) eight sprinklers for extended coverage sprinklers on 12 ft.×12 ft. sprinkler-to-sprinkle spacing; or (iii) six sprinklers for extended coverage sprinklers based on 14 ft.×14 ft. sprinkler-to-sprinkler spacing. Moreover, Section 21.1.8.2 provides that the minimum operating area based on the sprinkler-to-sprinkler spacing of the given number of design sprinklers shall be no less than 768 square feet. Other industry accepted standards, for example standards under FM Global (FM), define the number of design sprinklers for use in sprinkler systems for a storage occupancy based upon sprinkler orifice size, orientation, RTI (thermal response), spacing, and minimum operating pressure. Additionally, the number of sprinklers is determined by a fire test in which an appropriate safety factor is assessed on the total number of sprinklers that operate, such as for example, a 50% safety factor. The safety factor is designed to account for uncertainty in the operation sequence inherent to thermo-mechanically operated automatic sprinkler systems due to things such as sprinkler skipping, fire chasing, etc. The hydraulic designs and demand of the system define the water supply requirements of the system and the economic burden to fulfill those requirements, such as for example, by supplying the appropriate number and size of pump, piping or other fluid distribution equipment to meet the hydraulic designs. Accordingly, there is a desired balance between fulfilling a level of hydraulic demand and the economic burden to supply that demand in order to provide a desired level of fire protection. Generally, it is advantageous to minimize the hydraulic design area and/or number of design sprinklers of a system in order to reduce the overall hydraulic demand of the system in order to strike the appropriate balance.

In addition to specifying hydraulic design requirements, the installation standards also include location requirements for the automatic sprinklers. Automatic sprinklers are located above the stored commodity at or near the ceiling of the occupancy in order that its heat-activated element can be activated by the air/gases heated by a fire in the occupancy. Section 8.12.4 of NFPA 13 also includes "distance below ceiling" requirements to locate the deflector of the automatic sprinkler below the ceiling of the storage occupancy. According to the standards, a deflector of a pendent sprinkler is to be located at a maximum of 18 inches from the ceiling. The construction of the storage occupancy, particularly at or near the ceiling, can present obstructions to the spray pattern of a sprinkler, obstructions can include for example, beams, ducts, lights, trusses or bar joists at or near the ceiling. Accordingly, the installation standards provide for obstruction standards. Section 8.12.5 of NFPA 13 includes obstruction rules or requirements for Early Suppression Fast-Response Sprinklers to ensure that the sprinkler and its spray are clear of obstructions at or near the ceiling. The obstruction standards provide for a maximum allowable distance of the deflector above the bottom of the obstruction based upon the distance of the sprinkler from the side of the obstruction. Accordingly, both the structure of the automatic sprinkler and the existing installation standards can limit or restrict the ability to install a sprinkler above a stored commodity at increased distances from the ceiling which can add a burden to installing a system to provide a desired level of fire protection.

Thus, known fire protection systems that employ automatic sprinklers to protect storage occupancies have hydraulic and installation limitations that can add to the overall economic burden to provide the desired level of fire protection. It is therefore desirable to have systems and methods that can reduce the hydraulic demand of a system and/or provide an installation flexibility to provide fire protection for storage occupancies.

SUMMARY

Preferred embodiments of the fire protection systems and methods for storage occupancies are provided that can address, minimize and more preferably overcome the disadvantages of known installation and hydraulic design standards for automatic fire protection sprinklers. Preferred embodiments of the fire protection systems and methods can provide for hydraulic demands that are smaller or lower than previously known systems designed for protection of similar storage occupancies and configurations. The preferred systems and methods provide fire protection of the storage occupancy by controlled actuation of one or more selectively identified fire protection devices to effectively address a fire. Moreover, the systems and methods preferably respond and provide for the controlled actuation of the preferred fire protection devices at an incipient stage of the fire.

A preferred embodiment of the fire protection system for protection of a storage occupancy having a ceiling defining a nominal ceiling height includes a plurality of fluid distribution devices disposed beneath the ceiling and above a storage commodity in the storage occupancy. The plurality of fluid distribution devices are arranged for selective identification and controlled actuation in response to a fire. The preferred systems further include a hydraulic demand defined by at least one of: i) a hydraulic design area having a minimum operational area of less than 768 square feet; or ii) a number of design fluid distribution devices being less than twelve. Fluid distribution devices for use in the system and methods described herein include a frame body having an inlet for connection to a fluid supply and an outlet with an internal passageway extending between the inlet and the outlet. The frame body is arranged for controlled actuation discharge of fluid from the outlet to address a fire in a manner described herein. Preferred embodiments of the fluid control device include a deflector member to distribute the fluid to effectively address a fire.

Preferred embodiments of fire protection systems are provided for storage protection in which the hydraulic design of the systems are based upon hydraulic design area or a number of design fluid distribution devices that is smaller than specified under known design criteria. Preferred embodiments of the fire protection system provides protection for storage commodity in a storage occupancy. In preferred embodiments of the system, the plurality of fluid distribution devices are above storage commodity having a nominal storage height of twenty feet (20 ft), preferably over thirty feet (30 ft.) to a maximum nominal storage height of fifty-five feet (55 ft.). Preferred embodiments of the system include a plurality of detectors to monitor the occupancy for a fire and a controller coupled to the plurality of detectors to detect and locate the fire. The controller is preferably coupled to the plurality of distribution devices to identify and control operation of a select number of fluid distribution devices above and about the fire. Accordingly, preferred embodiments of the plurality of fluid distribution devices are selectively identified for controlled actuation preferably at an incipient stage of a fire which is believed to reduce the hydraulic demand of the preferred system. In addition, preferred arrangements of the detectors and fluid distribution device can provide for increased flexibility in installing below the ceiling of a storage occupancy. In preferred embodiments of the fluid distribution device includes a fluid deflector member, the deflector can be located above the stored commodity and below the ceiling of the occupancy at a preferred deflector-to-ceiling distance that is greater than eighteen inches (18 in.) and more preferably at a deflector-to-ceiling distance of at least twenty inches (20 in.).

A preferred method of fire protection is provided for a storage occupancy having a nominal ceiling height of 30 ft. or greater. The preferred method includes spacing a plurality of fluid distribution devices at the ceiling for controlled actuation; and interconnecting the plurality of fluid distribution devices to a supply of firefighting fluid with a network of pipes in which the network of pipes and plurality of fluid distribution devices having a hydraulic demand defined by at least one of: i) a hydraulic design area having a minimum operational area of less than 768 square feet; or ii) a number of design fluid distribution devices being less than twelve.

In preferred embodiments of the system and method in which the hydraulic demand is defined by the hydraulic design area of less than 768 square, the hydraulic design area has a preferred minimum operational area ranging from about 400 square feet to about 600 square feet. In an alternate embodiment, the hydraulic design area has a preferred minimum operational area of 256 square feet. In yet another alternate embodiment, the hydraulic design area can be any one of: i) less than 750 square feet; ii) less than 700 square feet; or iii) equal to or less than about 576 square feet.

In other preferred embodiments of the system and method in which the hydraulic demand is defined by less than twelve design fluid distribution devices, the number is of design devices is preferably at least four. In an alternate embodiment, the number of design devices is less than eight, more preferably less than eight to at least six; and in a particular embodiment the design devices provide for extended coverage on 12 ft.×12 ft. spacing. In another embodiment, the number of design fluid distribution devices is less than six and more preferably range less than six and at least four. In a particular embodiment, the design devices provide extended coverage on 14 ft.×14 ft. device-to-device spacing. In yet another preferred aspect of the system and method, the hydraulic design area and/or number of design fluid distribution devices is based upon appropriate large-scale fire test in which the number of fluid distribution devices identified for actuation are actuated and satisfactorily address the fire.

Although the Disclosure of the Invention and the preferred systems and methods described herein address the limitations of fire protection systems using automatic fire protections sprinklers under known design criteria, it be to be understood that the preferred systems and method can provide for storage fire protection using controlled actuated fluid distribution devices in systems of any desired hydraulic demand. The Disclosure of the Invention is provided as a general introduction to some embodiments of the invention, and is not intended to be limiting to any particular configuration or system. It is to be understood that various features and configurations of features described in the Summary of the Invention can be combined in any suitable way to form any number of embodiments of the invention. Some additional example embodiments including variations and alternative configurations are provided herein.

BRIEF DESCRIPTION OF THE DRAWINGS

The accompanying drawings, which are incorporated herein and constitute part of this specification, illustrate exemplary embodiments of the invention and, together with the general description given above and the detailed description given below, serve to explain the features of the invention. It should be understood that the preferred embodiments are some examples of the invention as provided by the appended claims.

DETAILED DESCRIPTION

Figure 1:
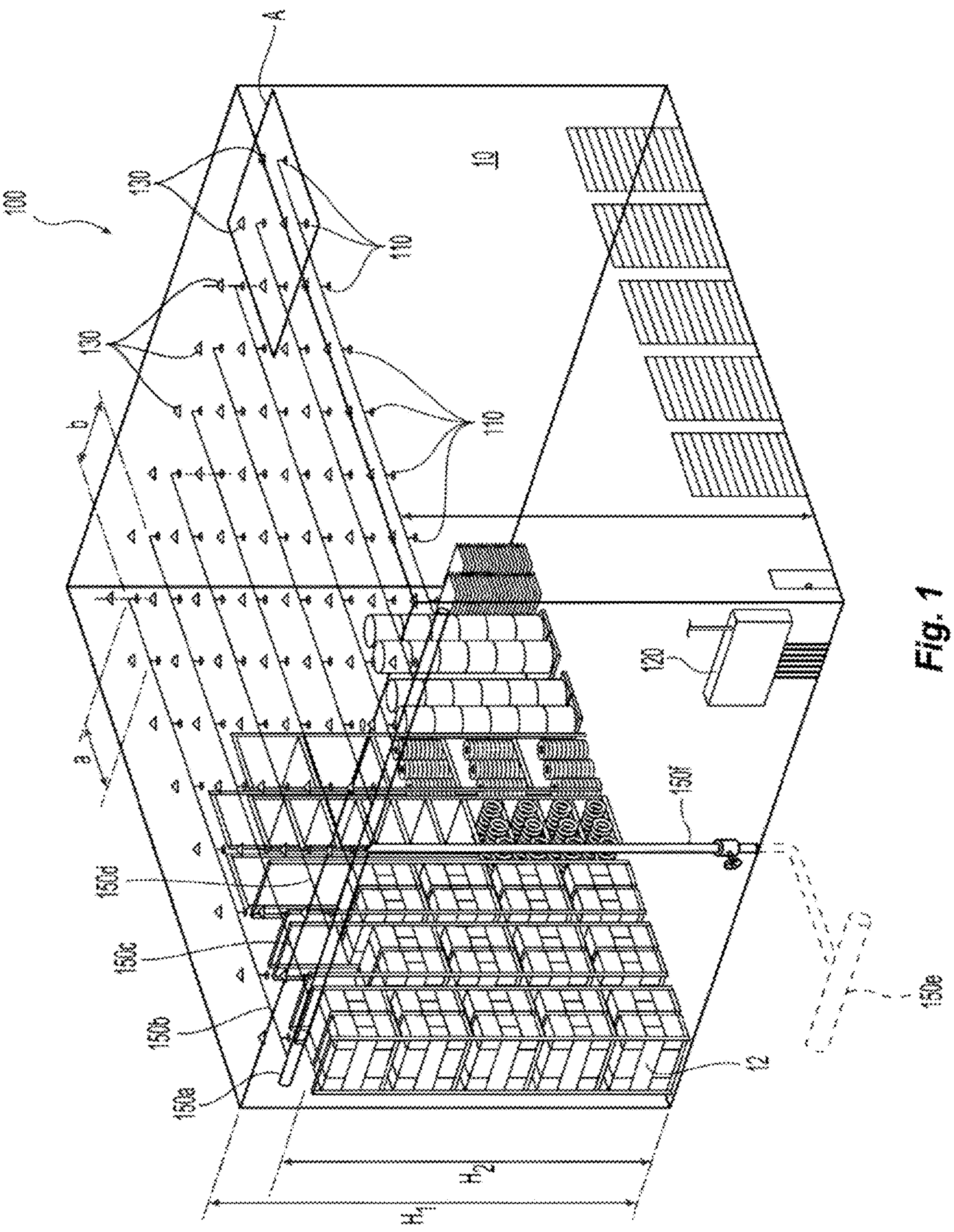
FIG. 1 is a representative illustration of one preferred embodiment of a fire protection system for storage.

Shown in FIG. 1 is a preferred embodiment of a fire protection system 100 for the protection of a storage occupancy 10 and one or more stored commodities 12. The preferred systems and methods provide fire protection of a storage occupancy by: (i) sensing a fire; (ii) measuring the fire including its location and size; (iii) analyzing the fire; (iv) responding to the fire with controlled actuation of one or more selectively identified fire protection devices; and (v) terminating the threat from the fire by effectively addressing the fire. The preferred systems can effectively address the fire with any one of fire control, fire suppression, extinguishment or a combination thereof. The industry accepted definition of "fire suppression" for storage protection is sharply reducing the heat release rate of a fire and preventing its regrowth by means of direct and sufficient application of a flow of water through the fire plume to the burning fuel surface. The industry accepted definition of "fire control" is defined as limiting the size of a fire by distribution of a flow of water so as to decrease the heat release rate and pre-wet adjacent combustibles, while controlling ceiling gas temperatures to avoid structural damage.

Figure 2A:
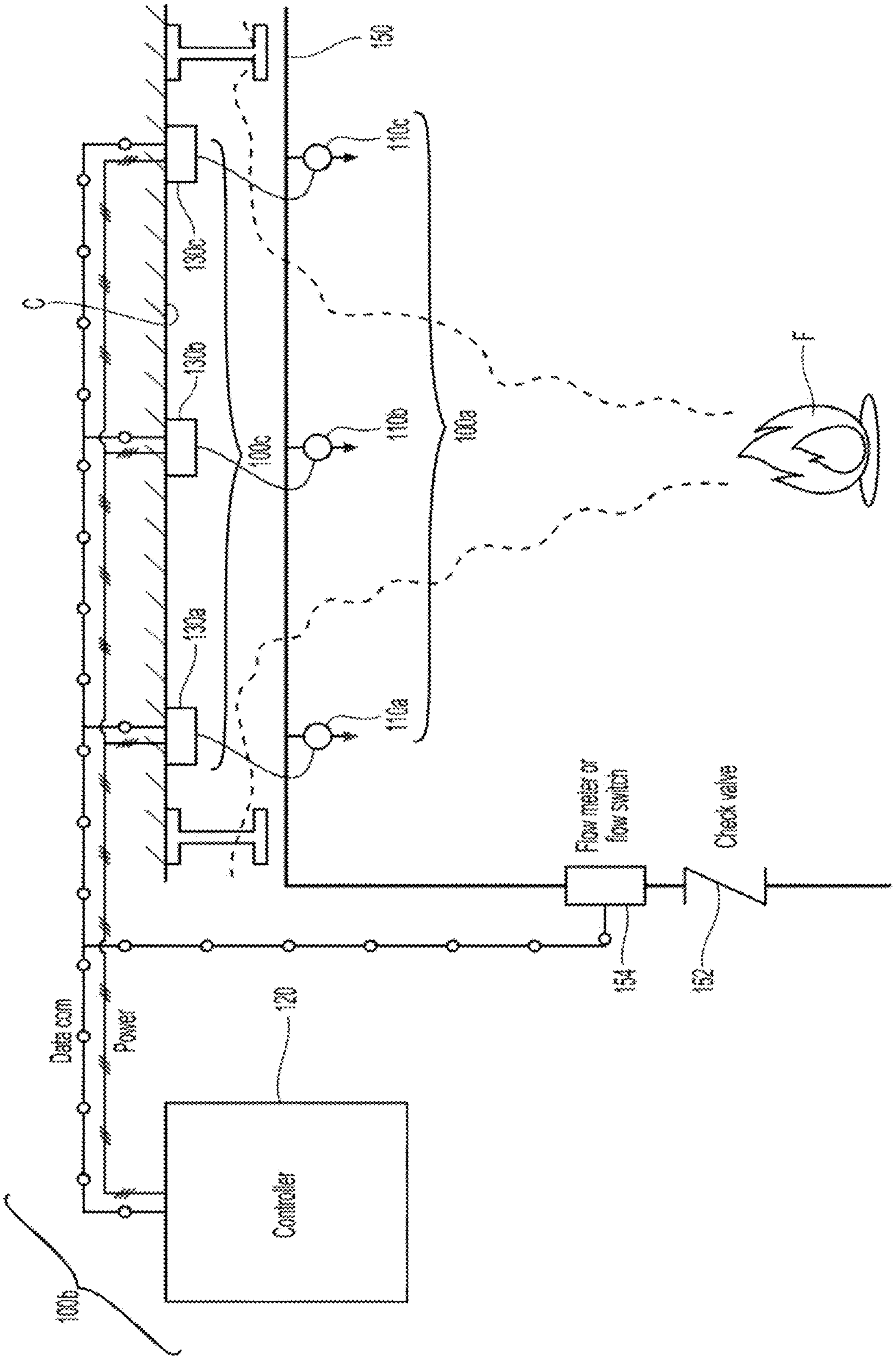
FIGS. 2A & 2B are schematic illustrations of operation of the system of FIG. 1.
Figure 2B:
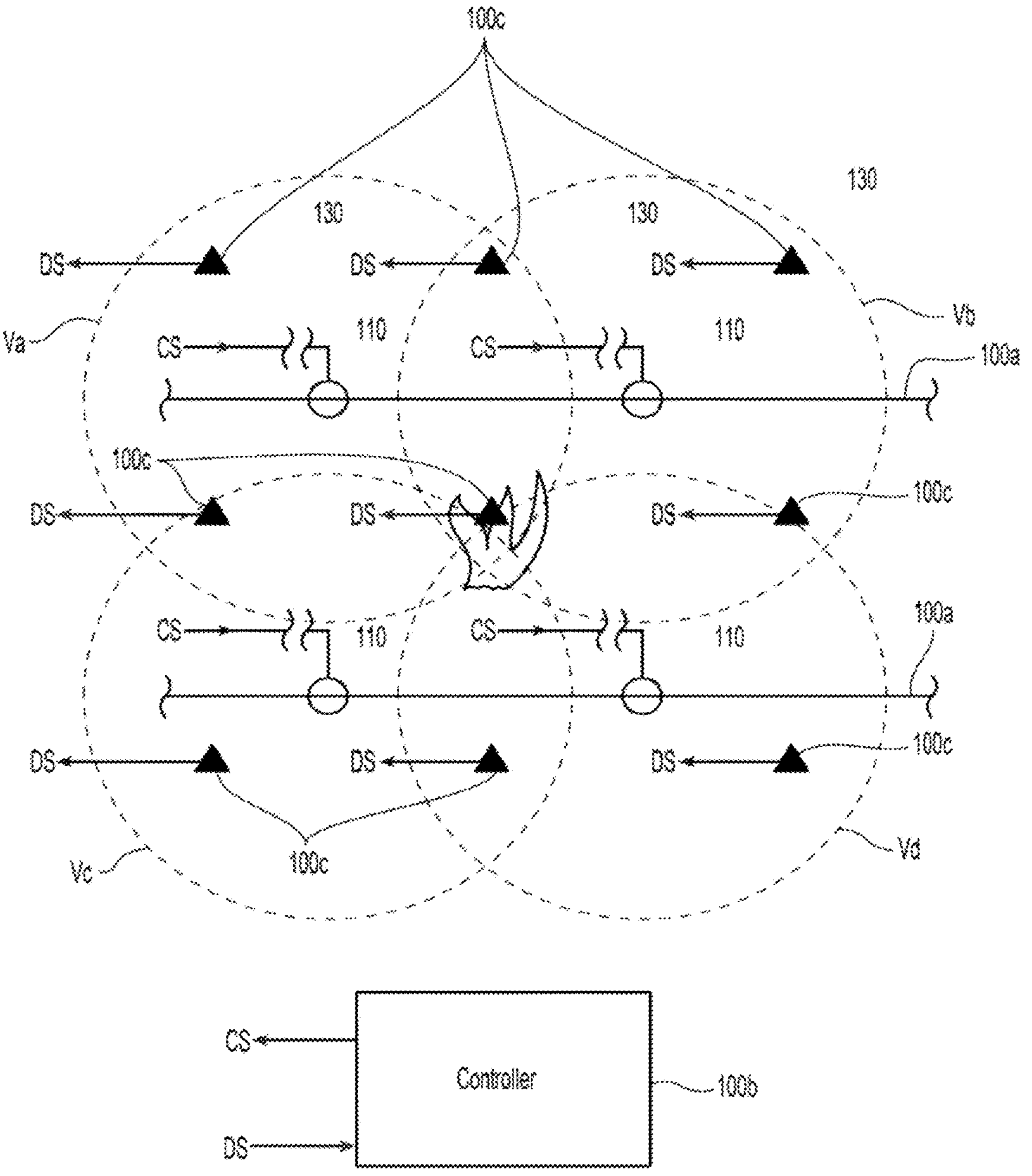

As schematically shown in FIGS. 2A and 2B, the preferred systems described herein include a fluid distribution sub-system 100*a*, a control sub-system 100*b* and a detection sub-system 100*c*. The detection and control sub-systems work together, preferably by communication of one or more detection signals DS, to sense, measure and analyze a fire. The control and fluid distribution sub-systems 100*a*, 100*b* work together, preferably by communication of one or more control signals CS, to target and timely deliver a volumetric flow V of firefighting fluid preferably substantially above and about the site of the fire in order to effectively address the fire. The volumetric flow V can be defined by one, or more preferably a collection, of distributed discharges Va, Vb, Ve, and Vd.

Figure 2C:
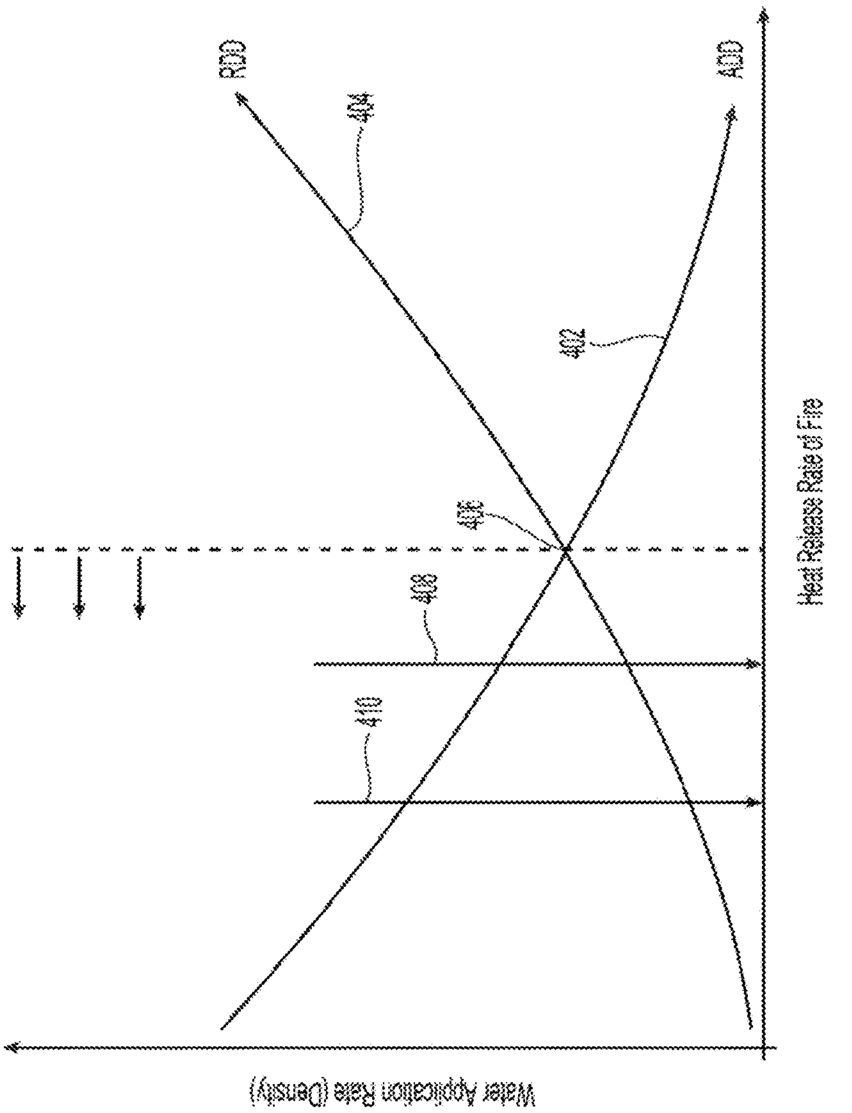
FIG. 2C is a graphic showing the preferred response time of the system of FIG. 1.

The time at which the volumetric flow V of firefighting fluid is released is preferably determined so as to minimize the overall hydraulic demand on the system yet be sufficient to effectively address the size of the fire at the time of delivery. Shown in FIG. 2C is a comparative graph 400 of heat release versus water application to show the preferred time of controlled actuation of the preferred system 100 as compared to known systems using independently actuated thermally responsive automatic sprinklers, such as for example, systems using early suppression fast response (ESFR) automatic sprinklers. The graph 400 shows a first curve 402 showing the actual delivery density (ADD) of water (in flow per area of application, e.g., gallons per minute per square foot (GPM/SQ. FT.) delivered to a stored commodity, at the commodity, as the heat release rate of fire increases. A second curve 404 shows the required delivery density (RDD) of water required to be delivered to the stored commodity at the commodity in order to provide fire suppression by water delivered at a minimum density. The intersection of the ADD and RDD curves defines a time or moment 406 of heat release in the fire in which ADD and RDD are equal to one another. It is believed that any moment in the fire heat release or growth before (or to the left) of the intersection 406 of ADD and RDD can provide for fire suppression performance because the ADD is greater than the RDD. For example, line 408 graphically shows a moment of early suppression with an early suppression fast response (ESFR) fire protection sprinkler using only automatic thermal response. Because the preferred system 100 can provide for a controlled actuation, the preferred system 100 can provide for system response to a fire that is earlier than known ESFR systems. More specifically, the preferred control and detection sub-systems 100*b*, 100*c* function to detect a fire preferably in its initial or incipient stages. The control and fluid distribution sub-systems 100*a*, 100*b* operate thereafter to address the fire preferably in its incipient stages. Line 410 shows a preferred time in the fire growth or heat release that is earlier than know ESFR system responses (line 408) at which the preferred system 100 is operated to address and more preferably suppress the fire. It is believed that the water demand of the system 100 is reduced as compared to known systems because the moment of controlled response defines an RDD that is smaller than the RDD of known suppression systems responding with only an automatic thermal response. It should be understood that the controlled system response of the system 100 can be controlled to alternatively provide for either standard response or early response to effectively address the fire.

Figure 3A:
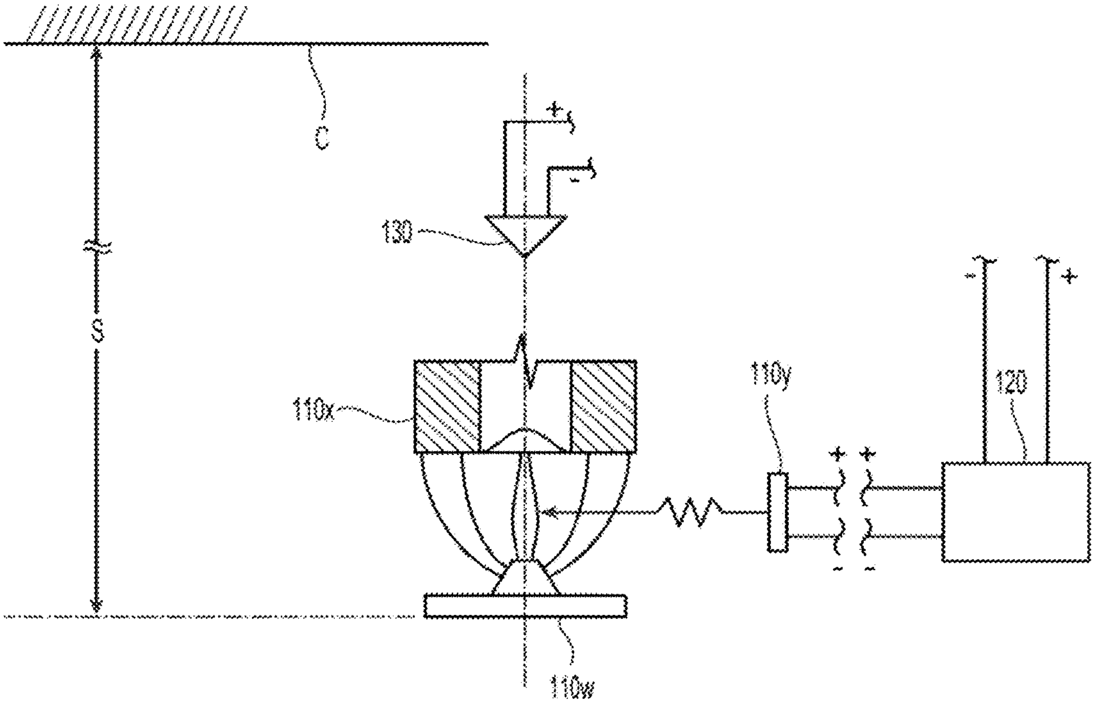
FIGS. 3A-3B are schematic illustrations of fluid distribution and detector arrangements for use in the system of FIG. 1.
Figure 3B:
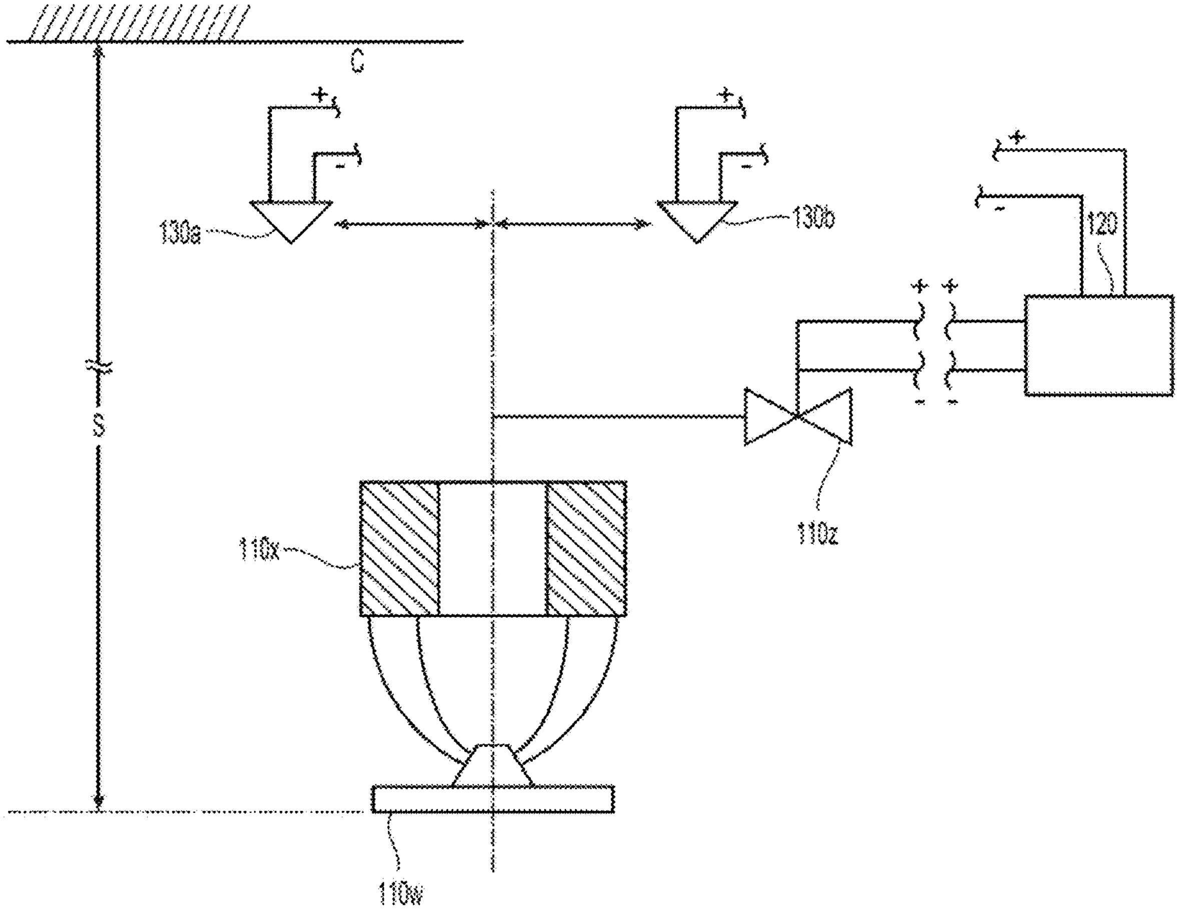

Referring again to FIG. 1, the preferred system 100 includes a plurality of fluid distribution devices 110, a plurality of detectors 130 and a centralized controller 120 for communication with each of the fluid distribution devices 110 and detectors 130. A preferred embodiment of the fluid distribution device 110 includes a fluid deflecting member 110*w* coupled to a frame body 110*x* as schematically shown in FIGS. 3A and 3B and arranged for controlled actuation in manner described herein. The frame body 110*x* includes an inlet for connection to the piping network and an outlet with an internal passageway extending between the inlet and the outlet. The deflecting member 110*w* is preferably axially spaced from the outlet in a fixed spaced relation. Water or other firefighting fluid delivered to the inlet is discharged from the outlet to impact the deflecting member 110*w* and generate a volumetric flow of fluid to effectively address a fire in a manner as described herein. Alternatively, the deflecting member can translate with respect to the outlet provided it distributes the firefighting fluid in a desired manner upon operation. Further in the alternative, the deflector or deflecting member can be oriented horizontal with respect to the commodity or otherwise oriented, for example, in an upright orientation relative to the frame body and its outlet. Accordingly, the fluid distribution device 110 can be structurally embodied with a frame body and deflector member of an "automatic fire protection sprinkler" as understood in the art and appropriately configured or modified for controlled actuation as described herein. This configuration can include the frame body and deflector of known automatic fire protection sprinklers with modifications described herein. The frame body and deflectors components for use in the preferred systems and methods can include the components of known automatic sprinklers that have been tested and found by industry accepted organizations to be acceptable for a specified sprinkler performance, such as for example, standard spray, suppression, or extended coverage and equivalents thereof. Alternate embodiments of the fluid distribution devices 110 for use in the system 100 include nozzles, misting devices or any other devices configured for controlled operation to distribute a volumetric flow of firefighting fluid in a manner described herein.

Figure 1A:
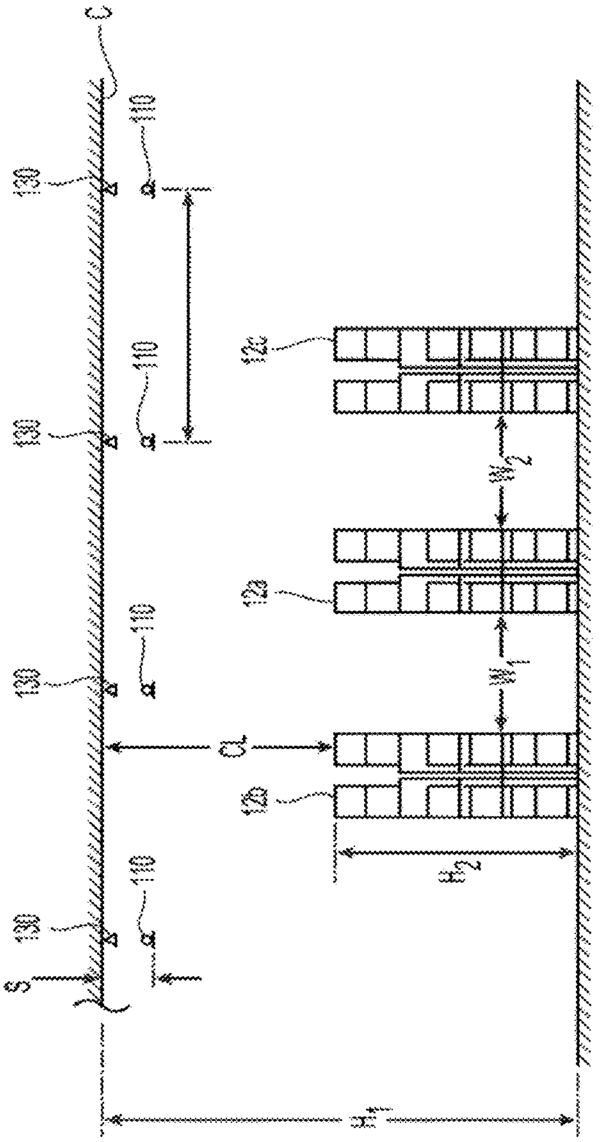
FIG. 1A is a schematic illustration of the embodiment of FIG. 1.

The fluid distribution devices 110 of the preferred system 100 are interconnected by the fluid distribution sub-system 100*a*. The fluid distribution sub-system includes a network of pipes 150 preferably having one or more main pipes 150*a* from which one or more branch lines 150*b*, 150*c*, 150*d* extend. In preferred embodiments of the fluid distribution sub-system, the preferred fluid distribution devices 110 are mounted or connected to the branch lines 150*b*, 150*c*, 150*d*. A branch line can define the device spacing a along a single branch line and the device spacing b between branch lines. As schematically shown in FIG. 1A, the fluid distribution devices 110 are installed beneath a ceiling C of a storage occupancy, such as for example, a warehouse above a storage commodity 12. As shown in FIG. 1A and FIGS. 3A,-3B, where the preferred device 110 includes a deflector member or deflector 110*w*, the deflector 110*w* can be located below the ceiling C and above the stored commodity 12 to define a preferred deflector position at a preferred desired-to-ceiling distance S. The distribution devices 110 are preferably mounted to and spaced along the spaced-apart branch pipes 150*b*, 150*c*, 150*d* to form a desired device-to-device spacing a (along branch lines)×b (between branch lines) as seen in FIG. 1. The device-to-device spacing is preferably 8 ft.×8 ft.; 10 ft.×10 ft.; 12 ft.×12 ft.; 14 ft.×14 ft. or any combination thereof.

The hydraulic demand can be directly related to the area of device operation over which a number of identified devices are controlled and operated to effectively address the fire in a manner as described herein. Accordingly, in a preferred aspect of the system 100, the spacing of the fluid distribution devices 110 defines the hydraulic demand of the system. The operation of the fluid distribution devices 110 in the preferred system 100 is not directly or independently triggered or actuated by a thermal or heat-activated response to a fire as in known "automatic sprinklers". Instead, the actuation of the fluid distribution devices 110 is controlled by the preferred controller 120 of the preferred control sub-system 100*b*. More specifically, the fluid distribution devices 110 are coupled directly or indirectly with the controller 120 to operate a select number of identified devices for distribution of a preferably fixed volumetric flow of fluid to effectively address the fire. Because the preferred system 100 can consistently control the number of devices 110 actuated to address a fire, the hydraulic demand can be controlled and therefore preferably minimized in a manner described herein. More particularly, the preferred system 100 provides for a controlled response to a fire by selecting the number and location of the devices 110 to define an area of operation above and disposed about the fire, in addition to controlling the time of actuation of the selected sprinklers to effectively address the fire. By preferably minimizing the operational area of the fluid distribution devices alone or in combination with a threshold moment for device actuation in the incipient stages of fire growth, the hydraulic demand of the system 100 is preferably minimized. It is believed that the preferred controlled operation of the system 100 can provide for a hydraulic demand that is smaller than known system designs using automatic fire protection sprinklers of comparable flow and distribution characteristics configured to protect the same occupancy.

The preferred storage fire protection system 100 and its demand is preferably hydraulically designed with a hydraulic design area A or area of device operation being less than about 768 square feet, preferably less than 750 square feet; more preferably less than 700 square feet; and even more preferably equal to or less than about 576 square feet. As used herein and schematically illustrated in FIG. 1, a "hydraulic design area A" is an area, defined in square units of measure, comprising a defined number of hydraulically remote fluid distribution devices at a defined spacing between each device. "Hydraulically remote devices" are fluid distribution device that places the greatest water demand on the system 100 in order to provide a prescribed minimum discharge pressure or flow. Alternatively or additionally, the preferred storage fire protection system 100 and its demand is preferably hydraulically designed based upon a preferred number of hydraulically remote devices, e.g., the "design fluid distribution devices" being provided with a preferred minimum operating pressure.

In one preferred embodiment of the system 100 in which a fire can be effectively addressed by four adjacent fluid distribution devices 110 above and about the fire, the hydraulic design area A is preferably defined by four hydraulically remote devices and the spacing therebetween. The preferred four hydraulically remote devices include two devices per branch lines on two branch lines with a device-to-device spacing of eight feet (8 ft.) along and between the two branch lines to define a hydraulic design area that is preferably 256 square feet. The device-to-device spacing can be varied to be any one of ten feet (10 ft.) or twelve feet (12 ft.) to respectively define hydraulic design areas A being any one of 400 square feet or 576 square feet. Alternatively, the hydraulic design area A is defined by nine (9) hydraulically remote fluid distribution devices with three devices per branch line on three branch lines with a device-to-device spacing of eight feet (8 ft.) along and between the three branch lines to define a hydraulic design area A of 576 square feet. Accordingly, the preferred system 100 can be hydraulically designed with a hydraulic design area that is smaller than currently available under the known installation standards. Additionally or alternatively, the hydraulic demand of the system 100 is preferably defined by a number of design fluid distribution device being less than twelve and having at least four, preferably having eleven or fewer and more preferably ranging from eight to six and more preferably ranging from six to four.

As hydraulic remote fluid distribution devices, the devices 110 defining the preferably minimized hydraulic design area A or preferred minimum design devices provide a prescribed volumetric flow at a minimum fluid pressure sufficient to address a fire of a particular size or a fire of a particular hazard. The fluid distribution devices 110 in the system 100 are provided with a preferred minimum operating pressure range that can effectively address a worst-case scenario test fire with any one of fire control, fire suppression or a combination thereof when the operating pressure is provided to the fluid distribution devices defining a test operational area that is configured as one of the preferred hydraulic design areas A as previously described. Accordingly, a preferred controlled actuated system and its fluid distribution devices can be installed in a test-fire setup for a controlled actuation to define a desired test operational area that effectively addresses a test fire of a particular test commodity or hazard with a given test pressure. Based on satisfactory test performance, the system 100 can be preferably hydraulically designed with a minimum hydraulic design area equal to the test operational area and with a minimum design pressure equal to the test pressure to protect a hazard equal to or less than the test hazard. An exemplary test-fire setup is described below.

From the test results, hydraulic design parameters including the preferred minimum number of design fluid distribution devices and a minimum operation pressure can be provided for use in the preferred controlled actuated system 100 for protection of a storage occupancy. By preferably minimizing the number of devices 110 operated to address a fire, alone or in combination with a time of their operation at an incipient stage in the fire growth, the hydraulic demand of the system 100 is preferably minimized. It is believed that the preferred controlled operation of the system 100 can provide for a hydraulic demand that is smaller than known system designs using automatic fire protection sprinklers configured to protect the same occupancy. In a preferred embodiment, the hydraulic demand of the system 100 is preferably defined by a number of design fluid distribution devices being less than twelve, eleven or fewer and more preferably ranging from eight to six and more preferably ranging from six to four.

Fluid distribution device 110 in the preferred systems and methods can include frame bodies and or deflector members of standard spray sprinklers, suppression sprinklers or extended coverage sprinklers and equivalents thereof which are suitable for use in storage applications. For example, U.S. Pat. No. 8,176,988, incorporated herein by reference, shows an exemplary fire protection sprinkler frame and deflector for use in the systems described herein. Specifically shown and described in U.S. Pat. No. 8,176,988 is an early suppression fast response sprinkler (ESFR), its sprinkler frame body and embodiments of deflecting member or deflector. The sprinkler shown in U.S. Pat. No. 8,176,988 is a pendent-type sprinkler; however upright-type sprinklers can be configured for use in the systems described herein. More preferably, sprinklers for configuration and use in the described systems herein include ESFR pendent sprinklers having a nominal K-factor of 25.2 GPM/(PSI)$^{1/2}$ A preferred fluid distribution device 110 for installation in the system 100 includes the frame body and deflector of the Model ESFR-25 Early Suppression, Fast Response Pendent Sprinkler from TYCO FIRE PRODUCTS, LP of Lansdale, PA having a nominal 25.2 K-factor ESFR. The preferred frame body and deflector member is shown in Tyco Fire Products, LP technical data sheet, TFP312 entitled, "Model ESFR-25, Early Suppression Fast Response Pendent Sprinklers 25.2 K-factor" (November 2012). As used herein, the K-factor is defined as a constant representing the discharge coefficient that is quantified by the flow of fluid in gallons per minute (GPM) from the outlet of the frame body divided by the square root of the pressure of the flow of fluid fed into the inlet of the frame passageway in pounds per square inch (PSI). The K-factor is expressed as GPM/(PSI)$^{1/2}$ A rated or nominal K-factor or rated discharge coefficient of a sprinkler as a mean value over a K-factor range. For example, for a K-factor 11 or greater, NFPA 13 provides the following nominal K-factors (with the K-factor range shown in parenthesis): (i) 11.2 (10.7-11.7) GPM/(PSI)$^{1/2}$; (ii) 14.0 (13.5-14.5) GPM/(PSI)$^{1/2}$; (iii) 16.8 (16.0-17.6) GPM/(PSI)$^{1/2}$; (iv) 19.6 (18.6-20.6) GPM/(PSI)$^{1/2}$; (v) 22.4 (21.3-23.5) GPM/(PSI)$^{1/2}$; (vi) 25.2 (23.9-26.5) GPM/(PSI)$^{1/2}$; (vii) 28.0 (26.6-29.4) GPM/(PSI)$^{1/2}$; and (viii) 33.6 (31.8-34.8) GPM/(PSI)$^{1/2}$. Alternate embodiments of the fluid distribution device 110 can include sprinklers having the aforementioned nominal K-factors or greater.

Shown in FIGS. 3A and 3B are schematic representations of preferred electro-mechanical coupling arrangements between a distribution device assembly or device 110 and the controller 120 for controlled actuation of the device. Shown in FIG. 3A is a fluid distribution device assembly 110 that includes a sprinkler frame body 110*x* having an internal scaling assembly supported in place by a removable structure, such as for example, a thermally responsive glass bulb trigger. A transducer and preferably electrically operated actuator 110*y* is arranged, coupled, or assembled, internally or externally, with the frame body 110*x* for displacing the support structure by fracturing, rupturing, ejecting, and/or otherwise removing the support structure and its support of the sealing assembly to permit fluid discharge from the frame body. The actuator 110*y* is preferably electrically coupled to the controller 120 in which the controller provides, directly or indirectly, an electrical pulse or signal for signaled operation of the actuator to displace the support structure and the sealing assembly for controlled discharge of firefighting fluid from the frame body 110*x* to impact a deflector member 110*w*.

Alternate or equivalent distribution device electro-mechanical arrangements for use in the system are shown in U.S. Pat. Nos. 3,811,511; 3,834,463 or 4,217,959. Shown and described in FIG. 2 of U.S. Pat. No. 3,811,511 is a sprinkler and electrically responsive explosive actuator arrangement in which a detonator is electrically operated to displace a slidable plunger to rupture a bulb supporting a valve closure in the sprinkler head. Shown and described in FIG. 1 of U.S. Pat. No. 3,834,463 is a sensitive sprinkler having an outlet orifice with a rupture disc valve upstream of the orifice. An electrically responsive explosive squib is provided with electrically conductive wires that can be coupled to the controller 120. Upon receipt of an appropriate signal, the squib explodes to generate an expanding gas to the rupture disc to open the sprinkler. Shown and described in FIG. 2 of U.S. Pat. No. 4,217,959 is an electrically controlled fluid dispenser for a fire extinguishing system in which the dispenser includes a valve disc supported by a frangible safety device to close the outlet orifice of the dispenser. A striking mechanism having an electrical lead is supported against the frangible safety device. The patent describes that an electrical pulse can be sent through the lead to release the striking mechanism and fracture the safety device thereby removing support for the valve disc to permit extinguishment fluid to flow from the dispenser.

Shown in FIG. 3B. is another preferred electro-mechanical arrangement for controlled actuation that includes an electrically operated solenoid valve 110*z* in line and upstream from an open sprinkler frame body 110*x* to control the discharge from the device frame. With no seal assembly in the frame outlet, water is permitted to flow from the open frame body 110_x_ upon the solenoid valve 110_z_ receiving an appropriately configured electrical signal from the controller 120 to open the solenoid valve depending upon whether the solenoid valve is normally closed or normally open. Water again discharged from the frame outlet to impact a deflector member 110_w_. Exemplary known electrically operated solenoid valves for use in the system 100 can include the electric 2/2 Series 8210 Pilot Operated General Service Solenoid Valves from ASCOR and equivalents thereof.

Referring to FIGS. 2A and 2B and the preferred system 100 for fire protection of storage, the detection sub-system 100_c_ and its preferred detectors 130 sense and analyze, directly or indirectly, a fire in the occupancy 10. The detection sub-system monitors 100_c_ the occupancy to determine environmental changes to identify a fire and its location within the storage occupancy 10. The system 100 and the controller sub-system 100_b_ preferably include one or more controllers 120 and more preferably a centralized controller 120 coupled to the detectors 130 and fluid distribution devices 110 for the controlled actuation of a defined or select group of devices 110 for distribution of the preferred volumetric flow of firefighting fluid to address the detected fire. Based upon the input from the detectors 130, the centralized controller 120 identifies ten or fewer devices 110 above and about the located fire to define the area of device operation, consistent with the hydraulic design area A of the system as previously described. In one preferred embodiment, the controller 120 identifies the ten or fewer, and more preferably the four or fewer, fluid distribution devices above and about the located fire for controlled actuation. Alternatively, the controller 120 identifies one, two or three select distribution devices 110 for addressing the detected fire.

Figure 4:
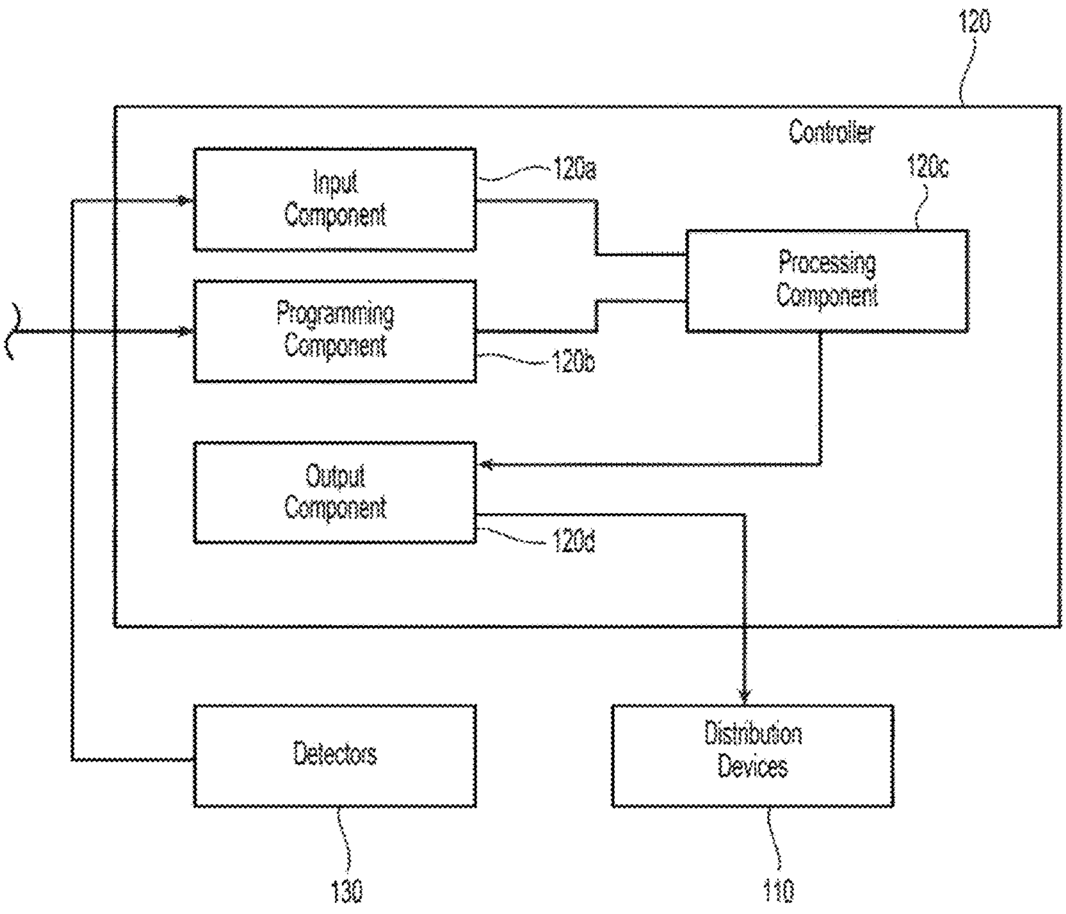
FIG. 4 is a schematic illustration of a controller arrangement for use m the system of FIG. 1.

A preferred centralized controller 120 is shown schematically in FIG. 4 for receiving, processing and generating the various input and output signals from and/or to each of the detectors 130 and fluid distribution devices 110. Functionally, the preferred controller 120 includes a data input component 120_a_, a programming component 120_b_, a processing component 120_c_ and an output component 120_d_. The data input component 120_a_ receives detection data or signals from the detectors 130 including, for example, either raw detector data or calibrated data, such as for example, any one of continuous or intermittent temperature data, spectral energy data, smoke data or the raw electrical signals representing such parameters, e.g., voltage or current that would indicate a measured environmental parameter of the occupancy. Additional data parameters collected from the detectors 130 can include time data, address or location data of the detector. The preferred programming component 120_b_ provides for user-defined operational parameters of the system to sense, measure and analyze a fire including, for example, its location and magnitude of its threat. The programming may be hard wired or logically programmed and the signals between system components can be one or more of analog, digital, or fiber optic data. Moreover, communication between components of the system 100 can be any one or more of wired or wireless communication. The programming component 120_b_ can provide for input of user-defined algorithms to identify fluid distribution devices or assemblies 110 for operation and their time of operation in response to the fire. A known exemplary controller for use in the system 100 is the Simplex® 4100 Fire Control Panel from TYCO FIRE PROTECTION PRODUCTS of Westminster, MA, which is shown and described in Technical Data Sheet S4100-0031-25 (November 2013).

Figure 4A:
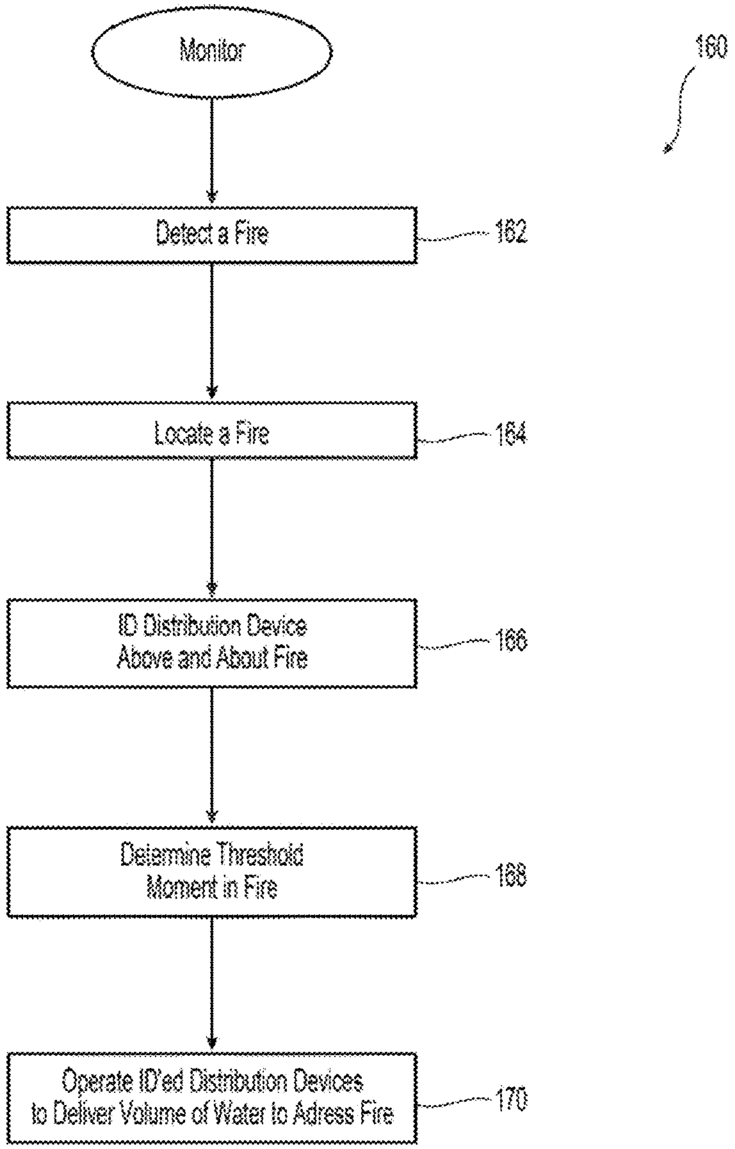
FIG. 4A is a preferred embodiment of controller operation of the system of FIG. 1.

Shown in FIG. 4A is one preferred operation or algorithm 160 of the controller 120, in which the processing component 120_c_ processes the input data to detect 162 and locate 164 the fire. Based upon the detection and/or other input data or signals, the processing component 120_c_ identifies 166, in accordance with the programmed algorithm, fluid distribution devices above and about the located fire to address the fire. In one preferred embodiment of the system and the control algorithm, each of the fluid distribution devices 110 are addressable by the controller 120 for controlled actuation. The preferred algorithm 160 can preferably queue the identified devices for actuation at a select or determined threshold moment 168 as defined by the preferred algorithm. In one preferred aspect of the programmed algorithm, a minimum number of fluid distribution devices 110 can be identified for controlled actuation 170 to provide the desired fire protection performance, such as for example, control performance, suppression performance, extinguishment or any combination thereof thereby placing a minimized hydraulic demand on the system consistent with the system's preferably minimized hydraulic design as previously described.

For example, the preferred algorithm 160 provides for the identification of ten or fewer fluid distribution devices 110 above and about the located fire to define the area of device operation, consistent with the hydraulic design of the system, for controlled actuation to address the detected and analyzed fire. In one preferred embodiment, the algorithm identifies the five, and more preferably the four, closest and adjacent devices above and about the located fire for controlled actuation. Alternatively, the processing component 120_c_ identifies one, two or three select distribution devices 110 for controlled actuation in accordance with the algorithm. In an additional or alternative example, the preferred algorithm provides for the identification of devices above and about the located fire to define the area of device operation for addressing the detected and analyzed fire consistent with the preferred eleven or fewer design fluid distribution devices. In one preferred embodiment, the algorithm identifies the five, and more preferably the four, closest and adjacent devices above and about the located fire. Alternatively, the processing controller 120_c_ identifies one, two or three select distribution devices 110 in accordance with the algorithm.

The processing component 120_c_ preferably determines a threshold moment 168 in the fire, for example at a preferably incipient stage of the fire, for actuation of the identified and selected fluid distribution devices 110. Accordingly, the preferred processing component 120_c_ and output component 120_d_ of the controller 120 further preferably generate appropriate signals for the output component 120_d_ to control operation 170 of the fluid distribution devices 110 in accordance with the programmed algorithm to effectively address the fire. The threshold moment 168 for actuation of the selected fluid distribution devices 110 can be a function of the collected data or parameters from the detectors 130 which measure the fire. For example, the threshold moment 168 may define a user-defined threshold heat release, user-defined maximum ceiling temperature, or user-defined rate of temperature rise.

The detection sub-system 100_c_ preferably continuously monitors the occupancy to identify a fire and its location within the storage occupancy 10. Alternatively, monitoring by the detectors 130 can be intermittent. In preferred embodiments of the system 100, disposed proximate the fluid distribution devices 110 are one or more detectors 130 for monitoring of the storage occupancy 10. The detectors 130 can be mounted so that they are axially aligned with the fluid distribution device and more particularly the frame body 110*x*, as seen for example in FIG. 3A, or may alternatively be above and off-set from the frame body 110*x*. Shown in FIG. 3B is one preferred embodiment, in which two detectors 130*a*, 130*b* are disposed above and preferably equally spaced about the frame body 110*x* for communication with the controller 120.

Further in the alternative, the detectors 130 can be disposed elsewhere about the occupancy 10 provided the detectors 130 can monitor the occupancy 10 to detect a fire as described herein. More preferably, the detectors 130 are disposed beneath the ceiling C and above the fluid distribution devices 110 to provide ceiling detection of a fire for preferred continuous monitoring of the occupancy 10. The spaced apart detectors 130 monitor the occupancy to detect changes for any one of temperature, thermal energy, spectral energy, smoke or any other parameter to indicate the presence of a fire in the occupancy. The detectors 130 can be any one or combination of thermocouples, thermistors, infrared detectors, smoke detectors and equivalents thereof. More preferably, the detectors 130 provide ceiling detection of a fire product, e.g., temperature or smoke. Examples of known detectors for use in the system include TrueAlarm® Analog Sensing analog sensors from TYCO SAFETY PRODUCTS WESTMINSTER of Westminster, MA, and shown in Technical Data Sheet S4098-0019-12 (August 2008).

The detectors 130 are coupled to the controller 120 to communicate detection data or signals to the controller 120 of the system 100 for processing as described herein. The ability of the detectors 130 to monitor environmental changes indicative of a fire can depend upon the type of detector being used, the sensitivity of the detector, coverage area of the detector, and/or the distance between the detector and the fire origin. Accordingly, the detectors 130 individually and collectively are appropriately mounted, spaced and/or oriented to monitor the occupancy 10 for the conditions of a fire in a manner described.

Unlike automatic sprinklers, the preferably spaced apart detector 130 and fluid distribution device 110 of the system 100 physically separates or uncouples the fire detection and fluid distribution functions between the components. Thus, by preferably locating the detectors 130 proximate or near the ceiling to monitor the occupancy for indications of a fire, the fluid distribution device 110 can be located at any desired distance beneath the ceiling and above the stored commodity. With reference to FIGS. 1A and FIGS. 3A-3B, where the fluid distribution device 110 includes a fluid deflector member 110*w*, the member 110*w* can be located above the stored commodity 12 and below the ceiling C at a preferred deflector-to-ceiling distance S that is greater than 18 inches and more preferably at a deflector-to-ceiling distance S of at least 20 inches. Accordingly, a preferred frame body and its deflector member 110*w* of the fluid distribution device 110 can be located below the ceiling C without the distance limitations or restrictions provided under the industry accepted installation standards, so long as the deflector of the device 110 is located above the stored commodity to provide the necessary fluid distribution to effectively address a fire. Moreover, by being able to locate the deflector 110*w* at a greater distance below the ceiling C than provided under the standards, the preferred installations of the system 100 can avoid the obstruction requirements under the standards. Therefore, the preferred systems 100 can provide for more flexibility in its installation as compared to known storage fire protection systems using only automatic sprinklers.

Referring again to FIG. 1, the preferred fluid distribution devices 110, branch lines and main pipe(s) can be arranged so as to define either one of a gridded network or a tree network. The network of pipes can further include pipe fittings such as connectors, elbows and risers, etc. to interconnect the network or grid of fluid distribution devices to the fluid distribution portion of the system 100. The fluid distribution sub-system 100*a* further preferably includes a riser pipe 150*f* which preferably extends from a fluid supply 150*c* to the main pipes 150*a*. The fluid distribution devices 110 are coupled to a supply of firefighting liquid such as, for example, a water main 150*e* or water tank. The fluid distribution sub-system can further include additional devices (not shown) such as, for example, fire pumps, or backflow preventers to deliver the water to the network of piping at a desired flow rate and/or pressure. The riser 150*f* can include additional components or assemblies to direct, detect, measure, or control fluid flow between the water distribution portion and the network of fluid distribution devices 110. For example, as seen in FIG. 2A, the system can include a check valve 152 to prevent fluid flow from the fluid distribution devices back toward the fluid source. The system can also include a flow meter 154 for measuring the flow through the riser 150*f* and the system 100. The system 100 is preferably configured as a wet system and can be further configured as a preaction system including variations thereof, i.e., single or double-interlock preaction. Accordingly, the riser 150*f* can include a fluid control valve, such as for example, a solenoid controlled deluge valve which operates upon detection of a fire by the detection sub-system 100*c*.

Figure 5A:
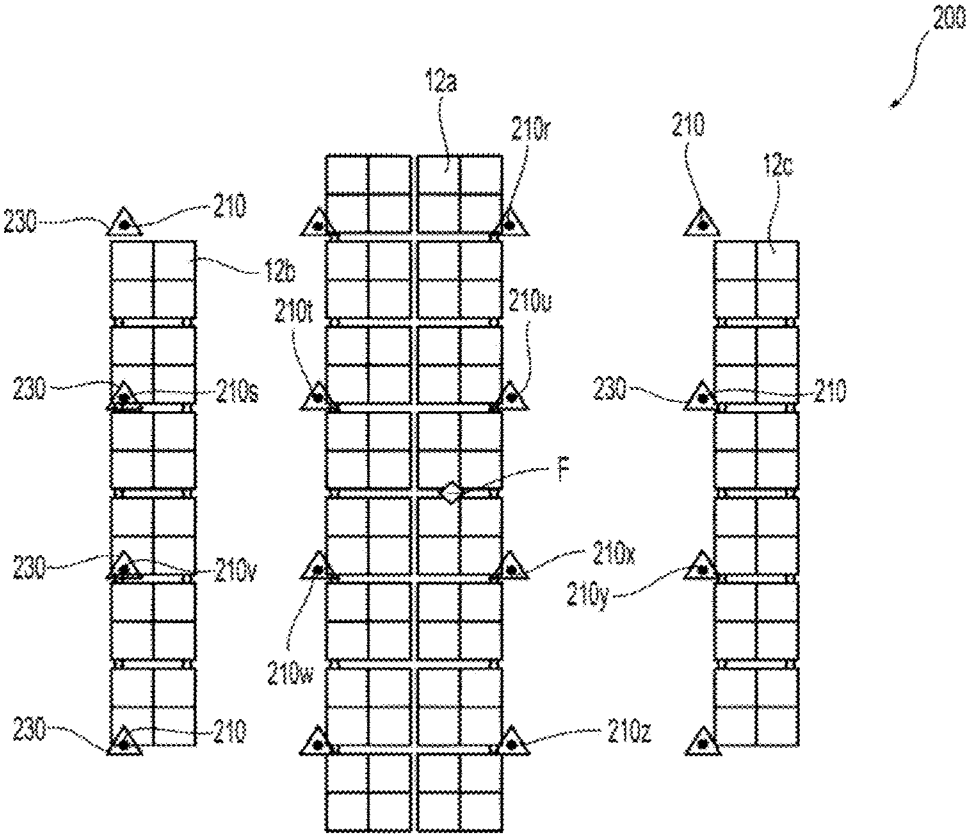
FIG. 5A is a schematic illustration of a test system using a preferred embodiment of the system of FIG. 1.

A control actuated system as previously described can be subject to actual fire testing 111 order to identify or verify preferred hydraulic design parameters including the hydraulic design area and minimum operating pressure for use in a preferred control actuated system installed for protection of a storage occupancy. For example, a plurality of preferred fluid distribution devices 210 and detectors 230 are installed above rack storage of cartooned unexpanded Group A plastic stored to a nominal storage height of 40 ft. under a 45 ft. horizontal ceiling as shown in the plan view of FIG. 5. More specifically, sixteen open frame bodies and of ESFR sprinklers, each having a nominal K-factor of 25.2 GPM/PSI.$^{1/2}$, and their deflector members are arranged with a solenoid valve and an axially aligned detector in a fluid distribution assembly, as schematically shown for example in FIGS. 3A, 3B and FIG. 5, to define an effective K-factor of 19.2 GPM/PSI.$^{1/2}$ The fluid distribution devices 210 are installed on 10 ft.×10 ft. spacing and supplied with water so as to provide a flow from each fluid distribution device that is equivalent to a nominal K-factor of 25 GPM/PSI.$^{1/2}$ supplied with an operating pressure of water at 35 psi. The fluid distribution devices 210 are installed beneath the ceiling so as to locate the deflector of the devices twenty inches (20 in.) beneath the ceiling C.

In the exemplary test setup, the fluid distribution devices 210 are installed above Group A Plastic commodity that includes single wall corrugated cardboard cartons measuring 21 in.×21 in. containing 125 empty crystalline polystyrene 16 oz. cups in separated compartments within the carton. Each pallet of commodity is supported by a two-way 42 in.×42 in.×5 in. slatted deck hardwood pallet. The commodity is stored in a rack arrangement having a central double-row rack with two single-row target arrays disposed about the central rack. The geometric center of the central rack is centered below four devices as indicated. Two half-standard cellulose cotton igniters are constructed from 3 in.×3 in. long cellulosic bundles soaked with 4 oz. gasoline and wrapped in a polyethylene bag. The igniters were positioned at the floor and offset 21 in. from the center of the central double row rack main array.

The igniters are ignited to provide a single fire test F of the system 200. The system 200 senses, measures and responds to the fire with a preferred control algorithm, for example, such as an algorithm previously described. In one exemplary test installation and operation, a total of nine fluid distribution devices 210*r*, 210*s*, 210*t*, 210*u*, 210*v*, 210*w*, 210*x*, 210*y*, 210*z* are identified for operation and operated within two minutes of ignition. The nine fluid distribution devices included four devices 210*t*, 210*u*, 210*w*, 210*x* located above and about the test fire F to define an included area of device operation of about 400 square feet. The four operated fluid distribution devices 210*t*, 210*u*, 210*w*, 210*x* effectively addressed the fire such that the fire and damage to the commodity was contained within the area of device operation and therefore did not spread to the ends of the main array or across the aisles to the targets. The maximum one-minute gas temperature above ignition was measured to be 309° F. and the maximum one-minute average steel temperature above ignition was measured to be 142° F. In view of the fire test results, the inventors believe that the preferred systems and methods described herein can be used to provide fire protection systems for storage with hydraulic demands lower than previously known. The fire test showed that a device operational area of less than 768 square feet and more particularly an operational area of 400 square feet or less was effective in addressing a fire of a high hazard commodity. It is believed that the test setup could be alternatively configured with a smaller device spacing, water delivery pressure and appropriate algorithm to operate, for example, only the four fluid distribution devices above and about the test fire F to identify an operational area of 256 square feet or other area to effectively address the high challenge test fire. Accordingly, preferred embodiments of the system 100 can be preferably hydraulically designed with a hydraulic design area having or equal to minimal operational area of less than 768 square feet, more preferably 400 square feet or less and even more preferably 256 square feet and with a minimum design pressure equal to the test pressure to protect a hazard equal to or less than the test hazard.

Moreover, additional hydraulic design parameters identified from the test results can include a hydraulic demand defined by a preferred minimum number of design fluid distribution devices and a minimum operating pressure for use in a preferred controlled actuated system for protection of a storage occupancy. The maximum number of design fluid distribution devices can be derived from directly or indirectly from the number of fluid distribution devices identified and actuated in the large-scale fire test to satisfactorily address the fire. For example, based upon the test results, a hydraulic demand defined by a preferred number of design fluid distribution devices being less than twelve, preferably nine or fewer and more preferably ranging from eight to six and more preferably ranging from six to four design fluid distribution devices. In one particular embodiment the number of design fluid distribution devices is less than any one of: (i) twelve sprinklers, the design devices providing standard coverage; (ii) eight sprinklers, the design devices providing extended coverage on 12 ft.×12 ft. device-to-device spacing; or (iii) six sprinklers, the design devices providing extended coverage on 14 ft.×14 ft. device-to-device spacing. A preferred minimum operating pressure identified for use can be at least 35 psi. or any minimum operating pressure for use with the preferred fluid distribution device to effectively address a fire in a preferred manner as described herein.

Accordingly, from the test results, one or more preferred hydraulic design parameters defining the hydraulic demand of the system include a preferred number of design fluid distribution devices, a minimum operation pressure and/or a preferred minimized hydraulic design area smaller than previously known can be provided for use in a preferred controlled actuated system for protection of a storage occupancy. In the preferred system installation, the piping and other fluid distribution equipment can be appropriately sized in accordance with the hydraulic demand and design of the system.

Referring again to FIGS. 1 and 1A, the preferred system 100 is further preferably defined by the storage occupancy in which it is installed. Parameters defining the system installation preferably include ceiling height H1 of the storage occupancy 10, storage height H2 of the commodity 12, classification of the commodity 12 and the storage arrangement of the commodity 12 to be protected. The ceiling C of the occupancy 10 can be of any configuration including any one of: a flat ceiling, horizontal ceiling, sloped ceiling or combinations thereof. The ceiling height H1 is preferably defined by the distance between the floor of the storage occupancy 10 and the underside of the ceiling C above (or roof deck) within the storage area to be protected, and more preferably defines the maximum height between the floor and the underside of the ceiling C above (or roof deck). The ceiling height H1 can be twenty feet (20 ft.) or greater, and can be nominally thirty feet (30 ft.) or greater, for example, up to a nominal forty-five feet (45 ft.) or higher such as for example up to sixty feet (60 ft.) or even greater.

The stored commodity 12 can be configured as a commodity array 12, preferably of a type which can include any one of NFPA-13 defined Class I, II, III or IV commodities, alternatively Group A, Group B, or Group C plastics, elastomers, and rubbers, including exposed and unexposed expanded plastics or further in the alternative any type of commodity capable of having its combustion behavior characterized. The commodity array 12 can be characterized by one or more of the parameters provided and defined in Section 3.9.1 of NFP A-13. The array 12 can be stored to a storage height H2, in which the storage height H2 preferably defines the maximum height of the storage and a nominal ceiling-to-storage clearance CL between the ceiling and the top of the highest stored commodity. Accordingly, the storage height H2 can be twelve feet (12 ft.) or greater and can be nominally twenty feet (20 ft.) or greater, such as for example, up to a nominal sixty feet or greater, preferably ranging nominally from between twenty feet and sixty feet, including being for example a nominal fifty-five (55 ft.). The storage height H2 can be maximized beneath the ceiling C to preferably define a minimum nominal ceiling-to-storage clearance CL of any one of one foot, two feet, three feet, four feet, or five feet (5 ft.) or anywhere in between. In addition, the stored commodity array 12 can preferably define a rack arrangement, preferably a multi-row rack storage arrangement; and even more preferably a double-row rack storage arrangement. As seen for example in FIG. 1A, the commodity array can includes spaced apart rack arrangements, 12*a*, 12*b*, 12*c* with an aisle spacing therebetween W1, W2. Additionally or alternatively, other storage configurations are possible, for example, the stored commodity array 12 preferably defines a high-piled storage commodity (in excess of twelve feet (12 ft.)) rack arrangement, such as for example, a single-row rack arrangement, preferably a multi-row rack storage arrangement; and even more preferably a double-row rack storage arrangement. Other high-piled storage configurations can be protected by the system 100, including non-rack storage arrangements including for example: palletized, solid-piled (stacked commodities), bin box (storage in five sided boxes with little to no space between boxes), shelf (storage on structures up to and including thirty inches deep and separated by aisles of at least thirty inches wide) or back-to-back shelf storage (two shelves separated by a vertical barrier with no longitudinal flue space and maximum storage height of fifteen feet). Other storage configurations are possible, as defined by NFPA 13 such as for example, on floor, rack without solid shelves. The storage area can also include additional storage of the same or different commodity spaced at an aisle width W in the same or different configuration.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A fire protection system, comprising:

a plurality of sprinklers, each sprinkler of the plurality of sprinklers comprising an early suppression fast response (ESFR) frame body, each sprinkler of the plurality of sprinklers installed beneath a ceiling of a storage occupancy, the storage occupancy to include a stored commodity having a storage height less than or equal to 60 feet, with the ceiling and the plurality of sprinklers above the stored commodity, the storage occupancy having a ceiling height less than or equal to 60 feet;

each sprinkler of the plurality of sprinklers having a K-factor in GPM/PSI$^{1/2}$ greater than or equal to 14.0 and less than or equal to 33.6, the ESFR frame body of each sprinkler of the plurality of sprinklers having an inlet, an outlet, and a passageway extending between the inlet and the outlet; and at least one sprinkler of the plurality of sprinklers configured to couple with at least one pipe of a network of pipes that provide a minimum operating pressure of fluid to the plurality of sprinklers, the network of pipes comprises a hydraulic design area including less than 12 hydraulically remote sprinklers of the plurality of sprinklers.

2. The fire protection system of claim 1, comprising:

the less than 12 hydraulically remote sprinklers are:

(a) 3 hydraulically remote sprinklers mounted to a first branch line of the network of pipes and 3 hydraulically sprinklers mounted to a second branch line of the network of pipes; or (b) 3 hydraulically remote sprinklers mounted to a first branch line of the network of pipes, 3 hydraulically remote sprinklers mounted to a second branch line of the network of pipes, and 3 hydraulically remote sprinklers mounted to a third branch line of the network of pipes.

3. The fire protection system of claim 1, comprising:

each hydraulically remote sprinkler of the less than 12 hydraulically remote sprinklers has a coverage area that is greater than or equal to 64 square feet and less than or equal to 100 square feet.

4. The fire protection system of claim 1, comprising:

each sprinkler of the plurality of sprinklers has an ESFR deflector.

5. The fire protection system of claim 1, comprising:

the stored commodity comprises at least one of a Class I commodity, a Class II commodity, a Class III commodity, a Class IV commodity, a Group A plastic, a Group B plastic and a Group C plastic.

6. The fire protection system of claim 1, comprising:

the storage height is greater than or equal to 12 feet, and the ceiling height is greater than or equal to 20 feet.

7. The fire protection system of claim 1, comprising:

the plurality of sprinklers have a sprinkler-to-sprinkler spacing that is greater than or equal to eight feet and less than or equal to twelve feet.

8. The fire protection system of claim 1, comprising:

the stored commodity has an arrangement comprising at least one of a rack arrangement or a non-rack arrangement.

9. The fire protection system of claim 1, comprising:

the stored commodity is arranged as at least one of (i) a rack arrangement comprising at least one of a single-row rack arrangement, a double-row rack arrangement, and a multi-row rack arrangement or (ii) a non-rack arrangement comprising at least one of a palletized arrangement, a solid-piled arrangement, a bin box arrangement, a shelf arrangement, a back-to-back shelf arrangement, an on floor arrangement, or a rack without solid shelves arrangement.

10. The fire protection system of claim 1, comprising:

a minimum clearance between the stored commodity and the ceiling is greater than or equal to one foot and less than or equal to five feet.

11. The fire protection system of claim 1, comprising:

the plurality of sprinklers comprise at least one of a pendent sprinkler or an upright sprinkler.

12. The fire protection system of claim 1, wherein the minimum operating pressure is 35 psi, comprising:

the network of pipes arranged in a grid or a tree configuration.

13. The fire protection system of claim 1, wherein the less than 12 hydraulically remote sprinklers is exactly 9 hydraulically remote sprinklers.

14. A fire protection system, comprising:

a plurality of early suppression fast response (ESFR) sprinklers, at least one of the plurality of ESFR sprinklers to couple with at least one pipe of a network of pipes in a storage occupancy in a gridded network or a tree network, the plurality of sprinklers to receive a minimum operating pressure of fluid from the network of pipes, the plurality of sprinklers forming a hydraulic design area including less than 12 hydraulically remote ESFR sprinklers, the plurality of ESFR sprinklers installed beneath a ceiling of a storage occupancy, the storage occupancy to include a stored commodity having a storage height less than or equal to 60 feet, with the ceiling and the plurality of ESFR sprinklers above the stored commodity, the storage occupancy having a ceiling height less than or equal to 60 feet;

each ESFR sprinkler of the plurality of ESFR sprinklers having a K-factor in GPM/PSI$^{1/2}$ greater than or equal to 14.0 and less than or equal to 33.6, each ESFR sprinkler of the plurality of ESFR sprinklers comprising a frame body having an inlet, an outlet, and a passageway extending between the inlet and the outlet, and a deflector coupled with the frame body.

15. The fire protection system of claim 14, comprising: the less than 12 hydraulically remote sprinklers are:
(a) 3 hydraulically remote sprinklers mounted to a first branch line of the network of pipes and 3 hydraulically remote sprinklers mounted to a second branch line of the network of pipes; or
(b) 3 hydraulically remote sprinklers mounted to a first branch line of the network of pipes, 3 hydraulically remote sprinklers mounted to a second branch line of the network of pipes, and 3 hydraulically remote sprinklers mounted to a third branch line of the network of pipes.

16. The fire protection system of claim 14, comprising:
each hydraulically remote sprinkler of the less than 12 hydraulically remote sprinklers has a coverage area that is greater than or equal to 64 square feet and less than or equal to 100 square feet; and
the plurality of sprinklers have a sprinkler-to-sprinkler spacing that is greater than or equal to eight feet and less than or equal to twelve feet.

17. The fire protection system of claim 14, comprising: each ESFR sprinkler of the plurality of ESFR sprinklers has an ESFR frame body.

18. The fire protection system of claim 14, comprising: each ESFR sprinkler of the plurality of ESFR sprinklers has an ESFR deflector.

19. A fire protection system, comprising:
a plurality of early suppression fast response (ESFR) frame bodies, each ESFR frame body of the plurality of ESFR frame bodies installed beneath a ceiling of a storage occupancy, the storage occupancy to include a stored commodity having a storage height less than or equal to 60 feet, with the ceiling and the plurality of ESFR frame bodies above the stored commodity, the storage occupancy having a ceiling height less than or equal to 60 feet;
each ESFR frame body of the plurality of ESFR frame bodies has a K-factor in GPM/PSI$^{1/2}$ greater than or equal to 14.0 and less than or equal to 33.6 and has an inlet, an outlet, and a passageway extending between the inlet and the outlet; and
at least one ESFR frame body of the plurality of ESFR frame bodies configured to couple with at least one pipe of a network of pipes that provide a minimum operating pressure of fluid to the plurality of ESFR frame bodies, the network of pipes having a hydraulic design area including less than 12 hydraulically remote ESFR frame bodies of the plurality of ESFR frame bodies.

20. The fire protection system of claim 19, comprising: the less than 12 hydraulically remote ESFR frame bodies are:
(a) 3 hydraulically remote ESFR frame bodies mounted to a first branch line of the network of pipes and 3 hydraulically remote ESFR frame bodies mounted to a second branch line of the network of pipes; or
(b) 3 hydraulically remote ESFR frame bodies mounted to a first branch line of the network of pipes, 3 hydraulically remote ESFR frame bodies mounted to a second branch line of the network of pipes, and 3 hydraulically remote ESFR frame bodies mounted to a third branch line of the network of pipes.

* * * * *